(12) United States Patent
Ogino et al.

(10) Patent No.: US 9,835,994 B2
(45) Date of Patent: Dec. 5, 2017

(54) ROLLER SUPPORT DEVICE, TRANSPORT DEVICE INCLUDING THE SUPPORT DEVICE, FIXING DEVICE INCLUDING THE SUPPORT DEVICE, AND IMAGE FORMING APPARATUS INCLUDING THE SUPPORT DEVICE

(71) Applicant: FUJI XEROX CO., LTD., Tokyo (JP)

(72) Inventors: Takuya Ogino, Kanagawa (JP); Shogo Kamiya, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/130,388

(22) Filed: Apr. 15, 2016

(65) Prior Publication Data

US 2017/0168436 A1 Jun. 15, 2017

(30) Foreign Application Priority Data

Dec. 14, 2015 (JP) ................................. 2015-243371

(51) Int. Cl.
*G03G 15/20* (2006.01)
*B65H 27/00* (2006.01)
*B65H 5/06* (2006.01)
*H04N 1/29* (2006.01)
*H04N 1/06* (2006.01)

(52) U.S. Cl.
CPC ......... *G03G 15/2053* (2013.01); *B65H 5/068* (2013.01); *B65H 27/00* (2013.01); *H04N 1/06* (2013.01); *H04N 1/29* (2013.01)

(58) Field of Classification Search
CPC ....... G03G 15/2053; G03G 2221/1654; G03G 2221/1657; G03G 15/757; Y10T 29/49556; Y10T 29/49549
USPC ........................ 267/260; 140/82; 29/895.22
See application file for complete search history.

(56) References Cited

U.S. PATENT DOCUMENTS 5,999,789 A * 12/1999 Sawamura ............. G01K 13/08
219/216
2006/0024098 A1   2/2006 Tomatsu et al.
2006/0159489 A1 * 7/2006 Ishii ................... G03G 15/2014
399/165

(Continued)

FOREIGN PATENT DOCUMENTS

JP       61-19265 U   *  4/1986
JP    09325634 A   * 12/1997

(Continued)

*Primary Examiner* — Sevan A Aydin
(74) *Attorney, Agent, or Firm* — Oliff PLC

(57) ABSTRACT

A roller support device includes a roller including a cylindrical portion having a through hole, a support member attached to a portion of an outer peripheral surface of the roller adjacent to the through hole to support the roller so that the roller is rotatable, and a restricting member including a bent hook and a contact portion. The restricting member restrains the support member from moving in a first direction of a rotation axis of the roller by contacting the support member at the contact portion. The bent hook is bent so as to extend to an inside of the cylindrical portion through the through hole and oppose a portion of the inner peripheral surface surrounding the through hole. The contact portion is disposed so as to extend in a circumferential direction of an outer peripheral surface of the roller and being capable of contacting the support member.

16 Claims, 13 Drawing Sheets

(56) References Cited

U.S. PATENT DOCUMENTS

| | | | | |
|---|---|---|---|---|
| 2007/0048047 A1* | 3/2007 | Matsuno | ............ | G03G 15/2053 |
| | | | | 399/333 |
| 2009/0022528 A1* | 1/2009 | Matsuno | ............ | G03G 15/2053 |
| | | | | 399/330 |
| 2012/0328342 A1* | 12/2012 | Takematsu | ......... | G03G 15/0189 |
| | | | | 399/333 |
| 2013/0094887 A1* | 4/2013 | Nawa | ................. | G03G 15/2053 |
| | | | | 399/330 |

FOREIGN PATENT DOCUMENTS

| | | | |
|---|---|---|---|
| JP | 2005-106235 A | | 4/2005 |
| JP | 2006-039433 A | | 2/2006 |
| JP | 2015-052687 A | | 3/2015 |
| JP | 2015052687 A | * | 3/2015 |

\* cited by examiner

ROLLER SUPPORT DEVICE, TRANSPORT DEVICE INCLUDING THE SUPPORT DEVICE, FIXING DEVICE INCLUDING THE SUPPORT DEVICE, AND IMAGE FORMING APPARATUS INCLUDING THE SUPPORT DEVICE

CROSS-REFERENCE TO RELATED APPLICATIONS

This application is based on and claims priority under 35 USC 119 from Japanese Patent Application No. 2015-243371 filed Dec. 14, 2015.

BACKGROUND

Technical Field

The present invention relates to a roller support device, a transport device including the support device, a fixing device including the support device, and an image forming apparatus including the support device.

SUMMARY

A roller support device according to an aspect of the invention includes a roller including a cylindrical portion having a through hole, a support member attached to a portion of an outer peripheral surface of the roller adjacent to the through hole to support the roller so that the roller is rotatable, and a restricting member including a bent hook and a contact portion. The restricting member restrains the support member from moving in a first direction of a rotation axis of the roller by contacting the support member at the contact portion to restrict a position of the support member. The bent hook is bent so as to extend to an inside of the cylindrical portion facing an inner peripheral surface of the cylindrical portion through the through hole of the roller and then to oppose a portion of the inner peripheral surface of the cylindrical portion surrounding the through hole. The contact portion is disposed so as to extend in a circumferential direction of an outer peripheral surface of the roller and is capable of contacting the support member.

BRIEF DESCRIPTION OF THE DRAWINGS

Exemplary embodiments of the present invention will be described in detail based on the following figures, wherein:

FIG. 14A illustrates the state where the restricting member of the roller support device is attached and FIG. 14B illustrates a phenomenon that occurs in the roller support device where the restricting member comes off.

DETAILED DESCRIPTION

Referring now to the appended drawings, exemplary embodiments of the invention (hereinafter simply referred to as "exemplary embodiments") are described below.

First Exemplary Embodiment

Figure 1:
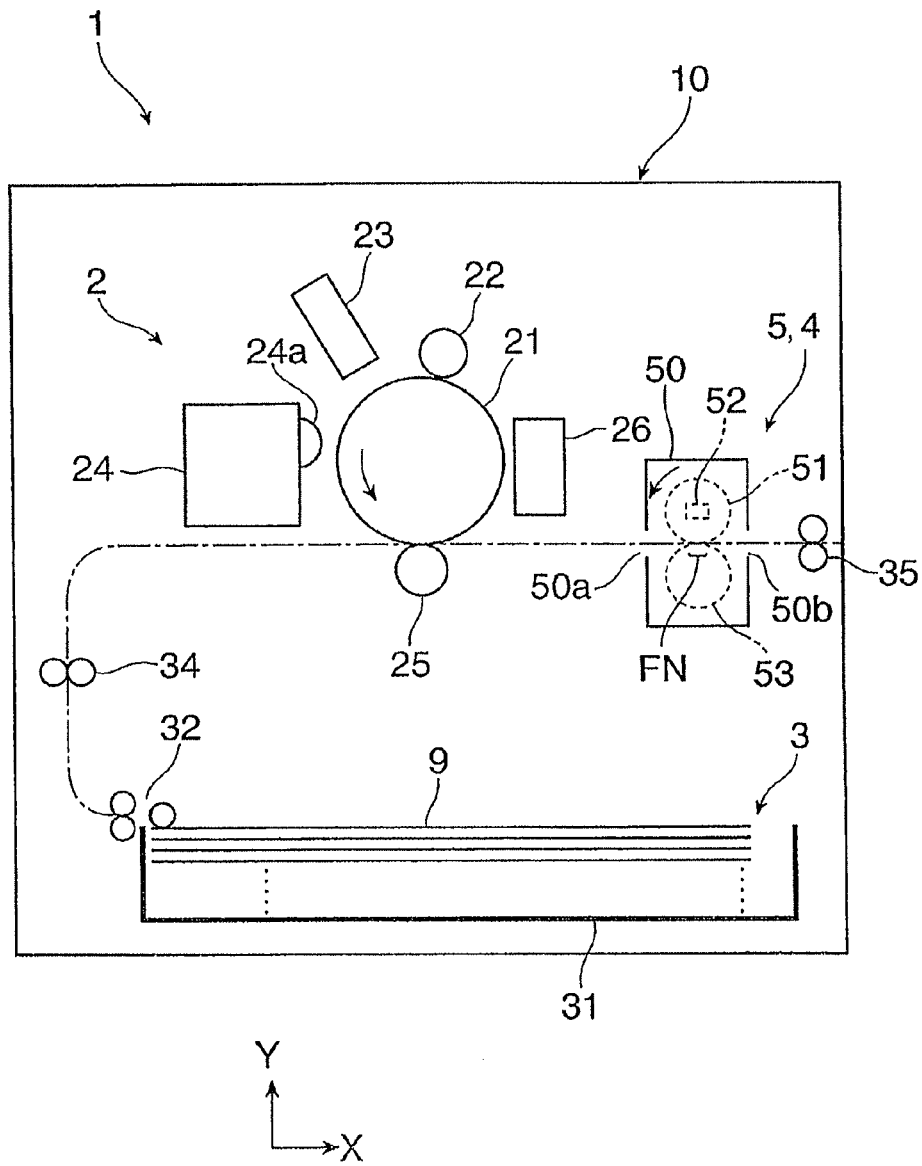
FIG. 1 is a schematic diagram of the entire configuration of an image forming apparatus including a fixing device according to a first exemplary embodiment.
Figure 2:
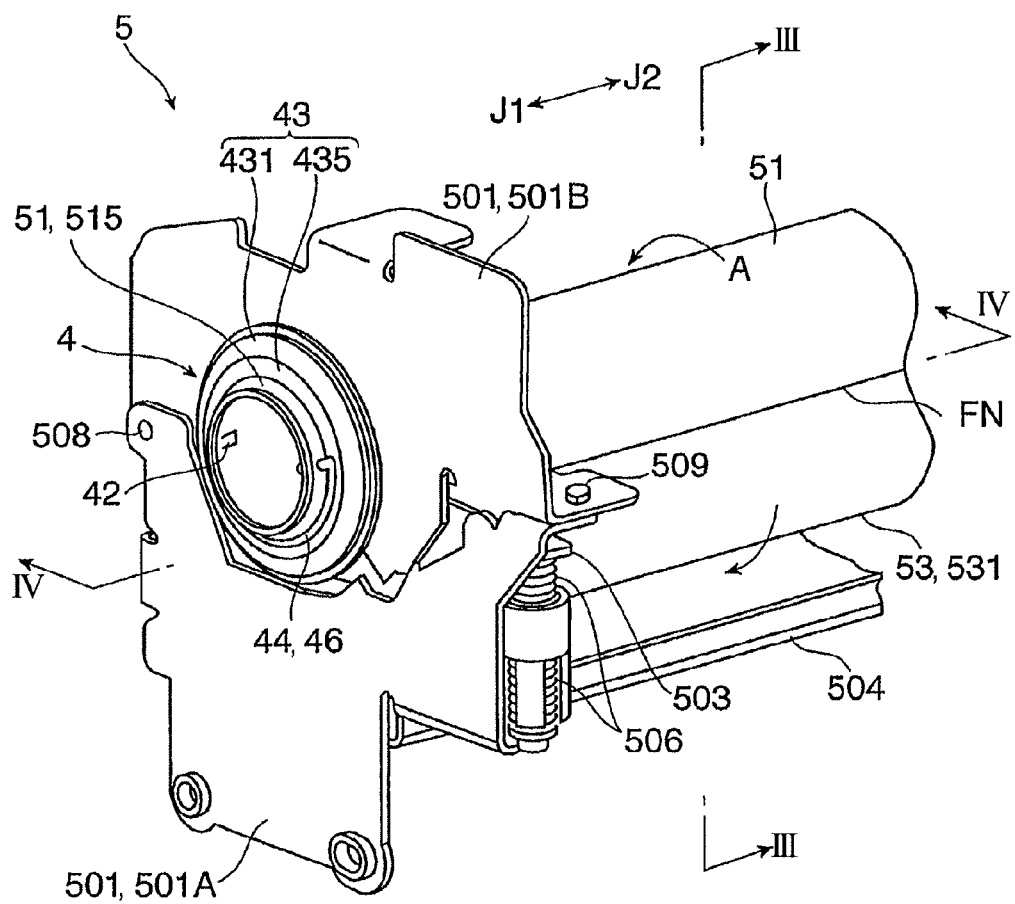
FIG. 2 is a perspective view of the fixing device of the image forming apparatus illustrated in FIG. 1, when viewed from one side surface.
Figure 3:
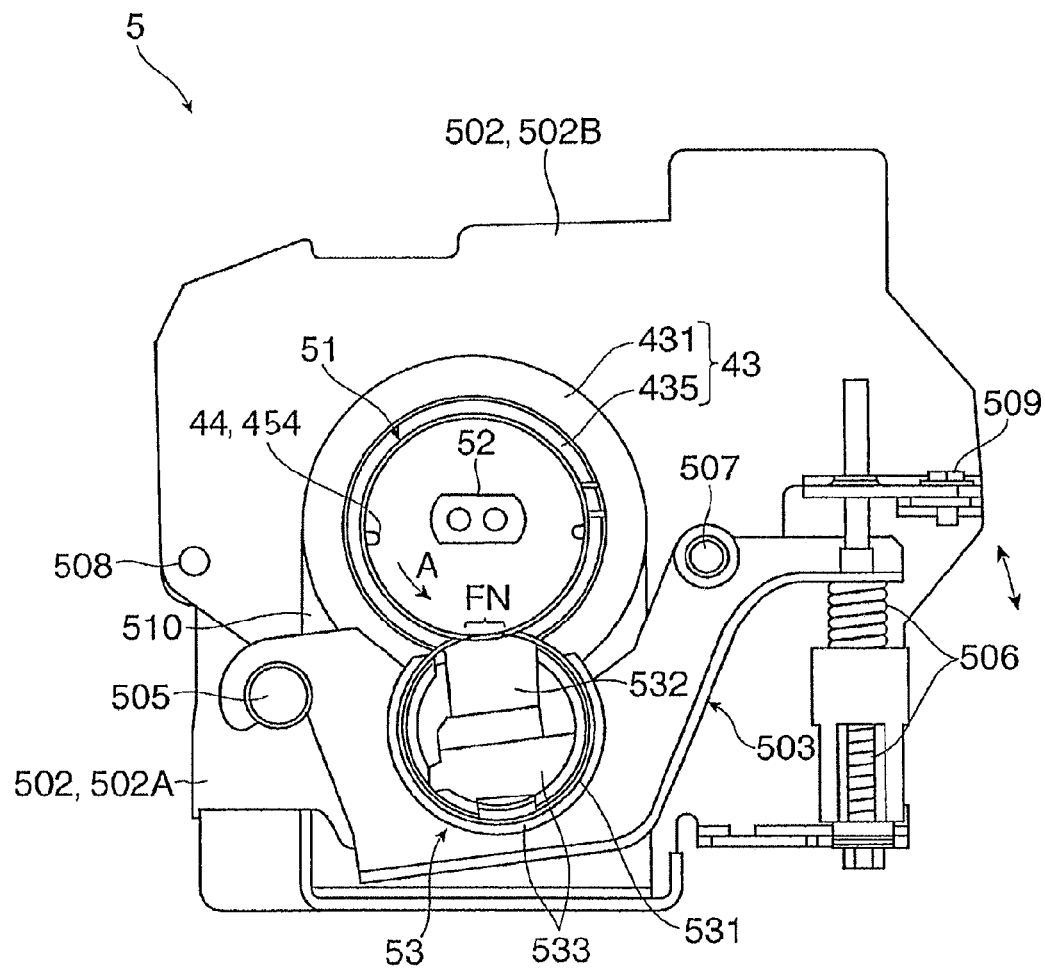
FIG. 3 is a cross-sectional view of the fixing device taken along the line in FIG. 2.
Figure 4:
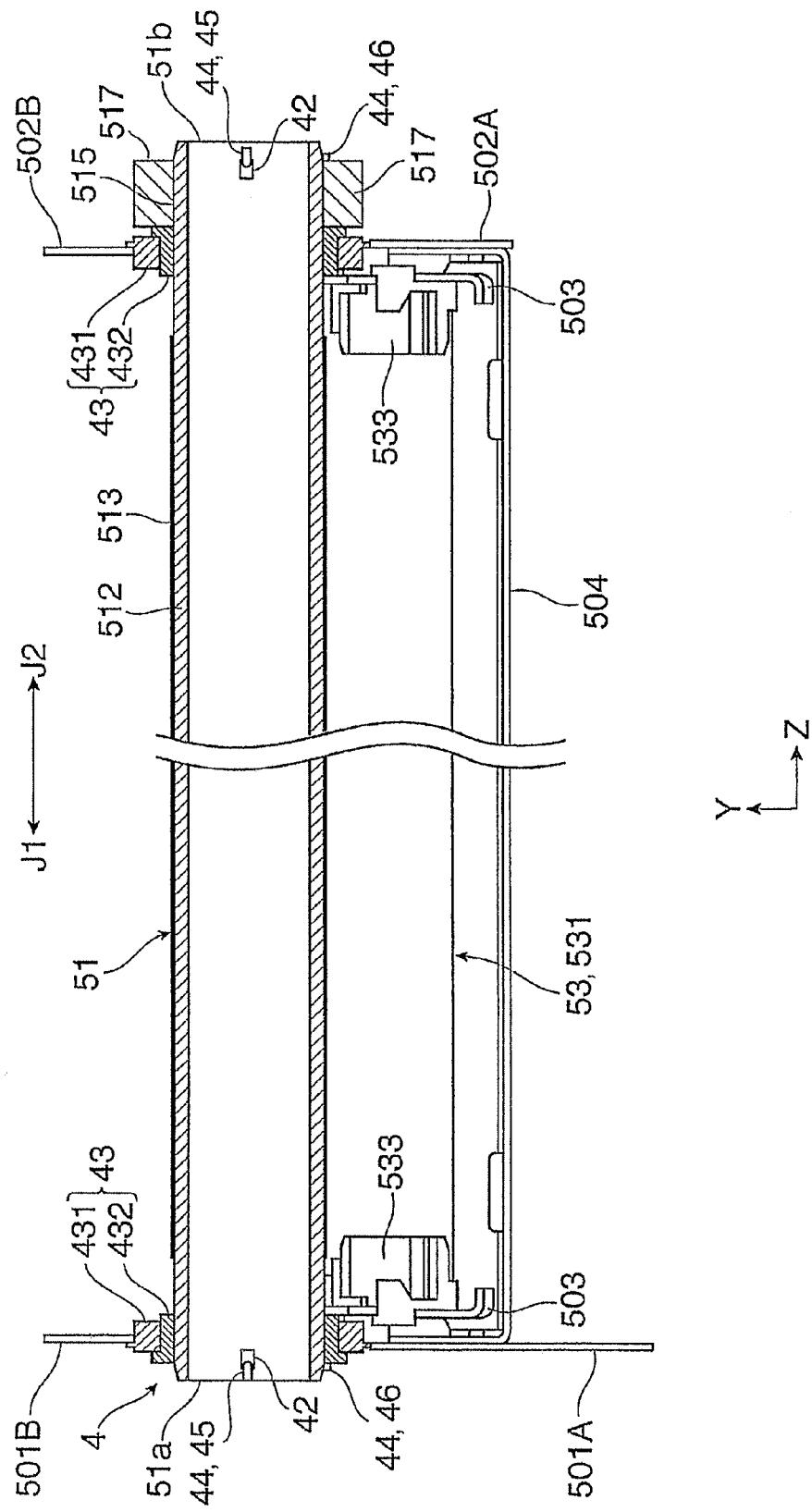
FIG. 4 is a cross-sectional view of the fixing device taken along the line IV-IV in FIG. 2.
Figure 5:
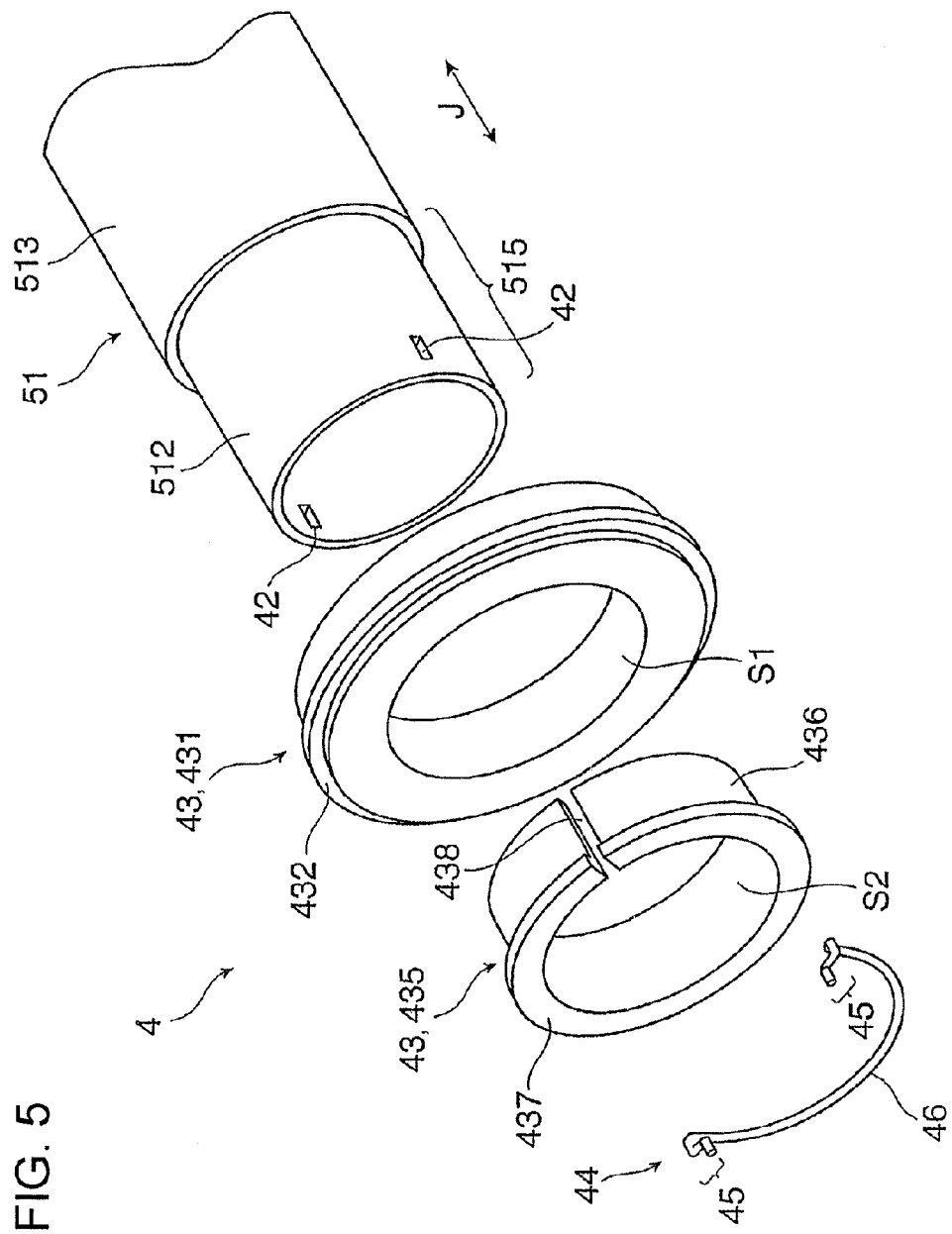
FIG. 5 is an exploded perspective view of components constituting the roller support device that supports a heating roller in the fixing device illustrated in FIG. 2 so that the heating roller is rotatable.

FIG. 1 to FIG. 4 illustrate an image forming apparatus 1 and the like including a fixing device 5 according to a first exemplary embodiment. FIG. 1 is a schematic view of the inside of the image forming apparatus 1, FIG. 2 illustrates the state of the fixing device 5 of the image forming apparatus 1 when viewed from one end side, FIG. 3 illustrates the state inside the fixing device 5, and FIG. 4 is a cross-sectional view of a portion of the fixing device 5. Arrows denoted with X, Y, and Z throughout the drawings including FIG. 1 are axes (directions) of rectangular coordinates respectively indicating the directions of the width, height, and depth of a three-dimensional space assumed in each drawing.

Entire Configuration of Image Forming Apparatus

As illustrated in FIG. 1, the image forming apparatus 1 includes components inside a housing 10, serving as an apparatus body. The components include an image forming unit 2, a sheet-feeding device 3, and a fixing device 5. The image forming unit 2 forms toner images or unfixed images composed of a developer and transfers the toner images to a recording sheet 9 serving as an example of a recording medium. The sheet-feeding device 3 accommodates predetermined recording sheets 9 and feeds the recording sheets 9 to a transfer position of the image forming unit 2. The fixing device 5 fixes, to the recording sheet 9, the toner images transferred to the recording sheet 9. The housing 10 includes various different components including structural members, support members, and exterior members.

The image forming unit 2 roughly includes a photoconductor drum 21, a charging device 22, an exposure device 23, a developing device 24, a transfer device 25, and a cleaning device 26. The photoconductor drum 21 is an example of a photoconductor that rotates in the direction indicated by the arrow illustrated in FIG. 1. The charging device 22 charges the surface (outer peripheral area over which images are formed) of the photoconductor drum 21 with electricity at a predetermined potential. The exposure device 23 irradiates the charged surface of the photoconductor drum 21 with light based on image data (signals) to form an electrostatic latent image. The developing device 24 develops the electrostatic latent image on the photoconductor drum 21 using a developer into a toner image. The transfer device 25 transfers the toner image on the photoconductor drum 21 to a recording sheet 9. The cleaning device 26 cleans the surface of the photoconductor drum 21 after transfer by removing undesired substances remaining on the surface, such as toner.

The sheet-feeding device 3 includes a sheet container 31 and a feeding device 32. The sheet container 31 accommodates multiple recording sheets 9 having predetermined properties, such as a size and a type, usable for image formation in a superposed manner. The feeding device 32 feeds the recording sheets 9 contained in the sheet container 31 one by one. The sheet container 31 is attached to the housing 10 so as to be allowed to be pulled out. Depending on the mode of use, multiple sheet containers 31 are provided to the housing 10. The dot-and-dash line illustrated in FIG. 1 indicates a rough sheet transport path in the housing 10 along which the recording sheets 9 are transported. The sheet transport path is composed of components, such as multiple pairs of transport rollers 34 and 35 and multiple transport guide members, not illustrated.

As illustrated in FIGS. 1 and 2, the fixing device 5 includes components inside a housing 50 including an inlet port 50a and an outlet port 50b, the components including a heating roller 51 and a pressing rotatable member 53. The heating roller 51 rotates in the direction indicated with the arrow in FIG. 1. The heating roller 51 is heated so that the surface temperature is heated to and kept at a predetermined temperature by a heating unit 52 such as a halogen heater. The pressing rotatable member 53 is in the form of a roller or in a belt-pad form in which it is driven to rotate by being brought into contact with the heating roller 51 at a predetermined pressure substantially in the rotation axis direction J of the heating roller 51. The fixing device 5 serves as a fixing operation unit in which a pressure contact portion FN, at which the heating roller 51 and the pressing rotatable member 53 contact each other, performs a predetermined fixing (heating and pressing) operation by allowing a recording sheet 9 to which unfixed toner image has been transferred to pass through the pressure contact portion FN while nipping the recording sheet 9.

The details of the fixing device 5 are described below.

The image forming apparatus 1 forms images in the following manner. The following exemplarily describes a basic image formation operation when an image is formed on one side of the recording sheet 9.

When the image forming apparatus 1 receives a command of starting an image formation operation, the photoconductor drum 21 of the image forming unit 2 starts rotating and the surface of the photoconductor drum 21 is charged with electricity having a predetermined polarity and potential by the charging device 22. Then, the charged surface of the photoconductor drum 21 is exposed to light based on image data by the exposure device 23 to form an electrostatic latent image having a predetermined potential. Thereafter, when the electrostatic latent image formed on the photoconductor drum 21 passes the developing device 24, the electrostatic latent image is developed into a visible toner image using toner charged with electricity having a predetermined polarity supplied through a development roller 24a.

Thereafter, the toner image formed on the photoconductor drum 21 is transported to a transfer position at which it opposes the transfer device 25 by the rotation of the photoconductor drum 21. At this time, with the transfer effect of the transfer device 25, the image is transferred to one side of the recording sheet 9 that has been transported to the transfer position along the sheet transport path from the sheet-feeding device 3. The surface of the photoconductor drum 21 after the transfer is cleaned by the cleaning device 26.

Subsequently, the recording sheet 9 to which the toner image has been transferred is transported to the fixing device 5 after being separated from the photoconductor drum 21 of the image forming unit 2. In the fixing device 5, the recording sheet 9 is introduced into and passes through the pressure contact portion (fixing operation unit) FN between the heating roller 51 and the pressing rotatable member 53 through the inlet port 50a of the housing 50 while being nipped by the pressure contact portion FN. During the passage, the recording sheet 9 is subjected to a fixing operation, so that the unfixed toner image melts under pressure and is thus fixed to the recording sheet 9. The recording sheet 9 subjected to the fixing operation is ejected from the fixing device 5 through the outlet port 50b of the housing 50, transported along the sheet transport path, and finally accommodated in a container, not illustrated, disposed outside the housing 10.

In this manner, a single-color image composed of toner of a single color is formed on one side of a recording sheet 9. Thus, a basic image formation operation of the image forming apparatus 1 is finished. When a command of performing an image formation operation on multiple sheets is issued, a series of operations is similarly repeated the number of times corresponding to the number of sheets.

Configuration of Fixing Device

As illustrated in FIGS. 2 to 4, in the fixing device 5, the above-described heating roller 51 and heating unit 52 are attached to plate-shaped side support members 501 and 502, which are portions of the housing 50. The above-described pressing rotatable member 53 is attached to a pair of swingable support members 503, which are portions of the housing 50.

The side support members 501 and 502 are kept connected together using components such as a coupling support member 504. As illustrated in FIG. 3 and other drawings, the pair of swingable support members 503 are a pair of frames having such a shape that a center portion is recessed so as to support the pressing rotatable member 53 from below. Each of these swingable support members 503 is attached to a support protrusion 505 disposed on the inner surface of the corresponding one of the side support members 501 and 502 so that one end portion of the swingable support member 503 that protrudes to one side of the pressing rotatable member 53 is rotatable in a direction indicated with the double-pointed arrow. In addition, each swingable support member 503 is attached to the support protrusion 505 in such a manner that the other end portion of the swingable support member 503 that protrudes to the other side of the pressing rotatable member 53 is kept pressed so as to be displaced toward the heating roller 51 by a pressure spring 506. The pressure spring 506 has its bottom end portion contacting a portion of the corresponding one of the side support members 501 and 502 and its top end portion contacting the underside of the other end portion of the corresponding swingable support member 503. A restriction protrusion 507 illustrated in FIG. 3 defines the upper limit of the range up to which the swingable support member 503 is swingable.

Each of the side support members 501 and 502 is divided into a lower side support member 501A or 502A and an upper side support member 501B or 502B. Each of the side support members 501 and 502 is openable as a result of the corresponding one of the upper side support members 501B and 502B being raised upward after being rotated around a support shaft 508 disposed at an upper portion of the corresponding lower side support member 501A or 502A. Each of the upper side support members 501B and 502B has an inverted U-shaped attachment hole (upward indentation) 510 at a lower middle portion, the attachment hole allowing one end portion of the heating roller 51 (a support member of a cylindrical portion, described below) to be fitted thereinto. Screws 509 illustrated in FIG. 2 and FIG. 3 are used to fix the upper side support members 501B and 502B and the lower side support members 501A and 502A in the closed state.

The heating roller 51 includes a cylindrical roller body 512 composed of a material such as a metal including aluminum and a surface layer 513 disposed on the outer peripheral surface of the roller body 512 except predetermined areas at both end portions. In the heating roller 51, a gear (helical gear) 517 is attached to and fixed to a second end portion 51b. The heating roller 51 rotates at a predetermined speed in the direction indicated with arrow A as a result of rotational power being transmitted to the gear 517 from a rotary driving device, not illustrated.

A pressing rotatable member having a belt-pad configuration is used as an example of the pressing rotatable member 53 according to the first exemplary embodiment. As illustrated in FIG. 3 and other drawings, this pressing rotatable member 53 having a belt-pad configuration includes an endless fixing belt 531, which rotates while contacting the outer peripheral surface of the heating roller 51, a press pad 532, which is disposed on the inner peripheral surface of the fixing belt 531 and forms a pressure contact portion FN as a result of pressing the outer peripheral surface of the fixing belt 531 against the outer peripheral surface of the heating roller 51, and support structures 533, which support the fixing belt 531 so that the fixing belt 531 is rotatable and support the press pad 532 while pressing the pressing pad 532 against the heating roller 51. The support structures 533 are fixed to the swingable support members 503. In FIG. 4, the heating unit 52 and the press pad 532 are not illustrated.

In the fixing device 5, the heating roller 51 includes the roller body 512 having a relatively small thickness (thickness within the range of 0.3 mm to 2.0 mm). Thus, a roller support device 4 having the following configuration is used as an example of a device that supports the heating roller 51 so that the heating roller 51 is rotatable.

Specifically, as illustrated in FIGS. 2 to 8, the roller support device 4 includes the heating roller 51, support members 43, and restricting members 44. The heating roller 51 has a configuration including a cylindrical portion 515 having two through holes 42. Each support member 43 is attached to a portion of the outer peripheral surface of the heating roller 51 adjacent to the corresponding through hole 42 to support the heating roller 51 so that the heating roller 51 is rotatable. Each restricting member 44 includes bent hooks 45 and a contact portion 46. Each bent hook 45 is bent so as to extend to an inside of the cylindrical portion facing the inner peripheral surface of the cylindrical portion 515 through the corresponding through hole 42 of the heating roller 51 and then to oppose a portion of the inner peripheral surface of the cylindrical portion 515 adjacent to the corresponding through hole 42. The contact portion 46 is disposed so as to extend in the peripheral direction of the outer peripheral surface of the heating roller 51 and is capable of contacting the support member 43. Each restricting member 44 restrains the support member 43 from moving in one direction (J1) of a rotation axis of the heating roller 51 by contacting the contact portion 46 to restrict the position of the support member 43.

The heating roller 51 has a cylindrical configuration as a whole. In the first exemplary embodiment, portions of the roller body 512 not covered with the surface layer 513 (both end portions) are defined as the cylindrical portions 515. Each cylindrical portion 515 of the heating roller 51 has two through holes 42 at two positions (one at each position) located at both ends of a semicircle of the outer circumferential surface of the cylindrical portion 515. Each cylindrical portion 515 in which the through holes 42 are formed serves as a member for supporting the heating roller 51 so that the heating roller 51 is at least rotatable.

The heating roller 51 suffices if it is supported by the roller support device 4 on particularly the side of an end portion 51a to which the gear 517 is not attached. In the first exemplary embodiment, however, the heating roller 51 is supported by the roller support device 4 also on the side of the end portion 51b to which the gear 517 is attached (FIG. 4).

Both of the two through holes 42 are long holes whose openings extend in the rotational axis direction J of the heating roller 51. The opening shape of each through hole 42 according to the first exemplary embodiment is a rectangle having long sides extending in the rotational axis direction J of the heating roller 51.

The support member 43 is a member that supports the heating roller 51 so that the heating roller 51 is rotatable at the corresponding one of the side support members 501 and 502, serving as part of the housing 50. The support member 43 according to the first exemplary embodiment includes a bearing member 431, which supports the heating roller 51 so that the heating roller 51 is rotatable, and a heat insulating member 435, disposed at least between the bearing member 431 and the outer peripheral surface of the heating roller 51.

The bearing member 431 of the support member 43 is composed of, for example, a radial bearing. A space S1 is defined by an inner ring constituting the radial bearing serving as the bearing member 431. The space S1 is so sized that the inner ring is allowed to be fitted to the outer peripheral surface of the cylindrical portion 515 of the heating roller 51 with a gap interposed therebetween. The bearing member 431 includes a continuous ridge 432 disposed on the outer peripheral surface of an outer ring so as to extend in the circumferential direction, the outer ring constituting the radial bearing serving as the bearing member 431. The position of the heating roller 51 in the rotational axis direction J is determined by bringing the bearing members 431 into contact with part of the side support members 501 and 502 (portions surrounding the attachment holes) when the bearing members 431 are to be fitted.

The heat insulating member 435 of the support member 43 includes a thick cylindrical body 436 and a flange 437. The thick cylindrical body 436 is fitted into a gap between the outer surface of the corresponding cylindrical portion 515 of the heating roller 51 and the corresponding bearing member 431 (part of the space S1 defined by the bearing member 431 excluding the cylindrical portion 515). The flange 437 is disposed throughout the circumference of the outer peripheral surface of the body 436 at one end. The flange 437 fixes the support member 43 in position in the rotational axis direction J of the heating roller 51 by contacting the bearing member 431 at the attachment of the heat insulating member 435.

The body 436 defines a space S2 on its inner side so as to be allowed to be fitted on the outer side of the corresponding cylindrical portion 515 of the heating roller 51. The outer diameter of the body 436 is so sized that the body 436 is allowed to be fitted into the space S1 defined by the bearing member 431. The heat insulating member 435 according to the first exemplary embodiment is a member having such a shape that a portion of the body 436 and a portion of the flange 437 in the circumferential direction are removed and form a removed portion 438. The heat insulating member 435 is not fixed to the outer peripheral surface of the cylindrical portion 515 of the heating roller 51 and is allowed to move relative to the outer peripheral surface of the cylindrical portion 515.

The heat insulating member 435 may be any member as long as it has such heat-insulating properties as to be capable of insulating transfer of heat generated by the heating roller 51 to the bearing member 431. For example, the heat insulating member 435 may be made of a heat insulating material such as synthetic resin having heat-insulating properties.

Each restricting member 44 includes the above-described bent hooks 45 and the contact portion 46. Each restricting member 44 restrains the support member 43 from moving in a first direction J1 in the rotational axis direction J of the heating roller 51 as a result of the support member 43 contacting the contact portion 46. The restricting member 44 according to the first exemplary embodiment is composed of an arc-shaped member having two end portions, which at least serve as the bent hooks 45.

More specifically, the restricting member 44 is formed in, for example, the following manner using a wire (wire member) made of a material such as metal including iron and having a predetermined length.

As illustrated in FIGS. 5 to 9 and other drawings, first, a large part of the wire in the middle portion excluding both end portions is bent into a semicircle at a curvature approximately the same as the outer diameter of the cylindrical portion 515 of the heating roller 51 to form the contact portion 46.

Then, both end portions of the wire are bent toward the outer side of the semicircle of the contact portion 46 (in other words, in the direction of the normal to the cylindrical portion 515 of the heating roller 51) and then bent so as to rise (portions bent thus far are each referred to as a "first bent portion 451"). The end portions are then bent in a direction perpendicular to the semicircle of the contact portion 46 (in other words, bent in the rotational axis direction J of the heating roller 51) (portions bent thus far are each referred to as a "second bent portion 452"). The end portions are then bent toward the inner side of the semicircle of the contact portion 46 (in other words, toward the inner side or rotation center of the cylindrical portion 515 of the heating roller 51) (portions bent thus far are each referred to as a "third bent portion 453"). Finally, the end portions are bend in the same direction as in the case of the second bent portions 452, that is, in the direction perpendicular to the semicircle of the contact portion 46 (portions bent thus far are each referred to as a "final bent portion 454"). These bent portions 451 to 454 constitute each bent hook 45.

In each bent hook 45, the final bent portion 454 functions as a hook portion that opposes a portion of the inner peripheral surface of the cylindrical portion 515, which is part of a portion (516) surrounding the corresponding through hole 42 and that is actually hooked on the portion. For example, the final bent portion 454 is disposed so that its end is directed toward the closer one (51a, for example) of both end portions 51a and 51b of the heating roller 51. The area enclosed by the two-dot chain line in FIG. 9 indicates an example of the portion 516 of the inner peripheral surface of the cylindrical portion 515 surrounding the through hole 42.

Figure 9:
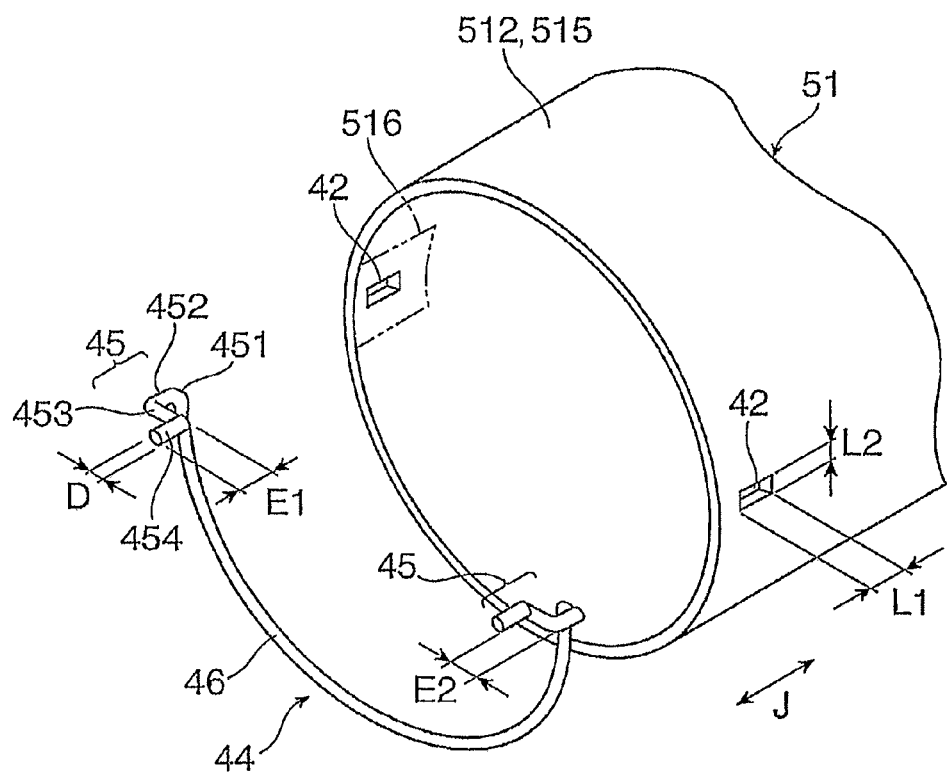
FIG. 9 is a perspective view of a configuration including through holes of the heating roller and a restricting member in the roller support device illustrated in FIG. 5.

The dimensions of each bent hook 45 of the restricting member 44 and the dimensions of each through hole 42 of the heating roller 51 have the following relationship (FIG. 9).

First, the length L1 of the long side of each through hole 42 in the rotational axis direction J is determined to be slightly larger than at least the length E1 of each final bent portion 454 of the bent hook 45 for allowing the final bent portion 454 to be inserted into the cylindrical portion through the through hole 42. The length L2 of the short side of each through hole 42 in the direction perpendicular to the rotational axis direction J is determined to be slightly larger than at least the gauges D of the third bent portion 453 and the final bent portion 454 of the bent hook 45 for allowing at least the third bent portion 453 and the final bent portion 454 to be inserted into the cylindrical portion 515 through the through hole 42. On the other hand, the length E2 of the third bent portion 453 of the bent hook 45 is determined to be larger than at least the total sum of the thickness of the cylindrical portion 515 and the gauge D of the final bent portion 454 for allowing the final bent portion 454 to pass through the through hole 42 and to be disposed on the inner peripheral surface of the cylindrical portion 515.

The arc length of the semicircle of the contact portion 46 of the restricting member 44 is determined so that the two bent hooks 45 at both ends of the restricting member 44 are allowed to reach the respective through holes 42 of the heating roller 51 and to be inserted into the through holes 42 for attachment of the restricting member 44.

The roller support device 4 is assembled with the fixing device 5 in, for example, the following manner.

Figure 10A:
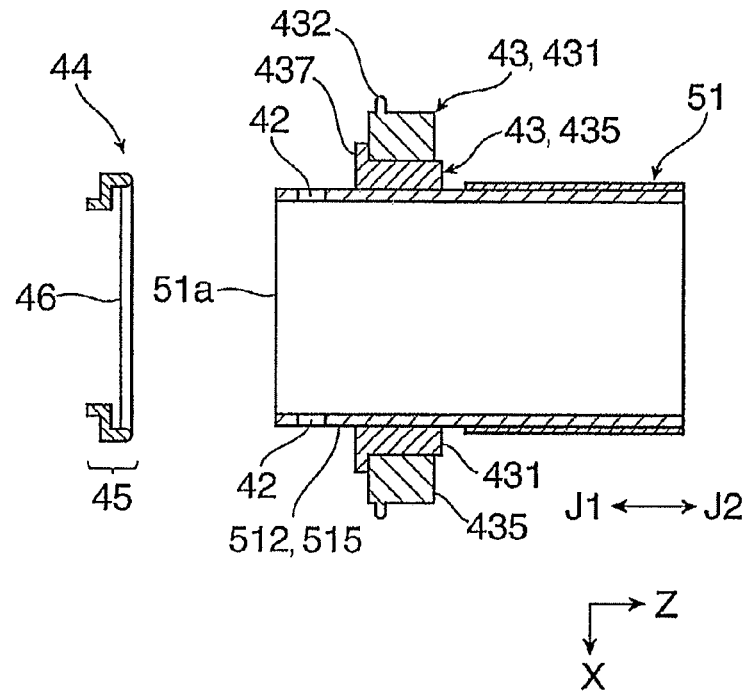
FIGS. 10A and 10B are schematic cross-sectional views illustrating different states in one process during assembly of the roller support device illustrated in FIG. 5.

As illustrated in FIG. 10A, first, the bearing member 431 and the heat insulating member 435 of the support member 43 are fitted to the cylindrical portion 515 at the first end portion 51a of the heating roller 51. Then, the bearing member 431 and the heat insulating member 435 of the support member 43 are fitted to the cylindrical portion 515 at the second end portion 51b of the heating roller 51. Thereafter, the gear 517 is fitted to the outer side of the support member 43 of the cylindrical portion 515.

Figure 10B:
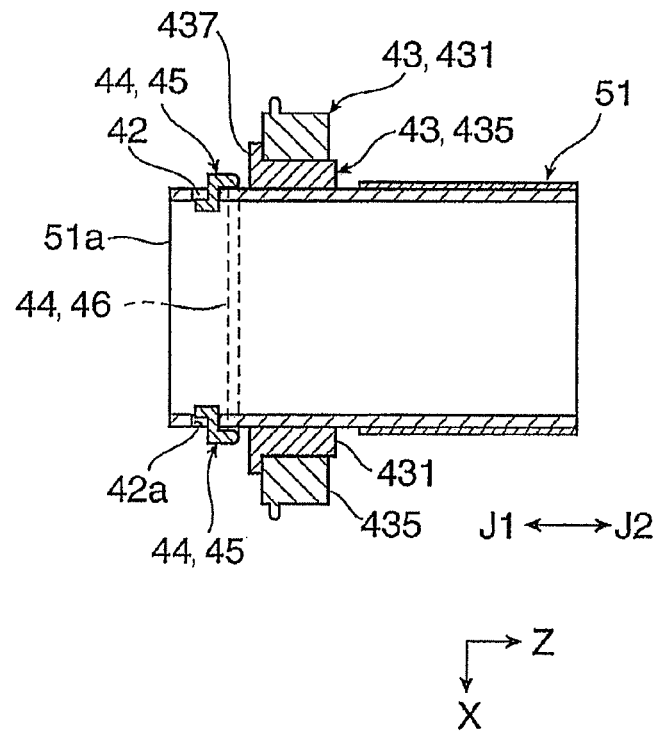

Subsequently, as illustrated in FIG. 10B, two bent hooks 45 of the restricting member 44 are inserted into the respective through holes 42 of the cylindrical portion 515 at each of both end portions 51a and 51b of the heating roller 51 from the outer peripheral surface of the cylindrical portion 515.

At this stage, in each restricting member 44, the final bent portion 454 of the bent hook 45 simply passes through the through hole 42 and is simply disposed on the inner peripheral surface side of the cylindrical portion 515. In other words, in each restricting member 44, the final bent portion 454 of the bent hook 45 has not yet opposed the portion 516 of the inner peripheral surface of the cylindrical portion 515 surrounding the corresponding through hole 42. Moreover, the contact portion 46 of the restricting member 44 has not yet contacted the flange 437 of the heat insulating member 435 of the corresponding support member 43 (FIG. 10B). In this stage, however, the contact portion 46 of each restricting member 44 contacts the outer peripheral surface of the corresponding cylindrical portion 515.

Subsequently, the bearing member 431 and the heat insulating member 435 of the support member 43 fitted to the cylindrical portion 515 at each of both end portions 51a and 51b of the heating roller 51 are displaced or moved toward the corresponding one of the end portions 51a and 51b of the heating roller 51 until they are restricted by the corresponding restricting member 44. For example, the bearing member 431 and the heat insulating member 435 are brought into the state illustrated in FIG. 8 excluding the side support members 501A and 501B.

At this time, the movement of the support member 43 also displaces the restricting member 44 in the following manner. Specifically, when the flange 437 of the heat insulating member 435 of the support member 43, in motion, contacts the contact portion 46 of the corresponding restricting member 44, the entirety of the restricting member 44 is displaced over the outer peripheral surface of the corresponding cylindrical portion 515 toward the corresponding end portion 51a or 51b of the heating roller 51. Thus, the third bent portion 453 of each bent hook 45 of the restricting member 44 is pressed against a short side 42a (FIG. 10B, also referred to as a first short side 42a, below) of the corresponding through hole 42 adjacent to the corresponding one of the end portions 51a and 51b of the heating roller 51. When each restricting member 44 has entered this state, the restricting member 44 stops being displaced.

Finally, the heating roller 51 to which the support members 43 and the restricting members 44 are attached is fitted to and attached to the attachment portions (attachment holes 510) of the upper side support members 501B and 502B, in the open state, of the housing 50 of the fixing device 5.

Figure 8:
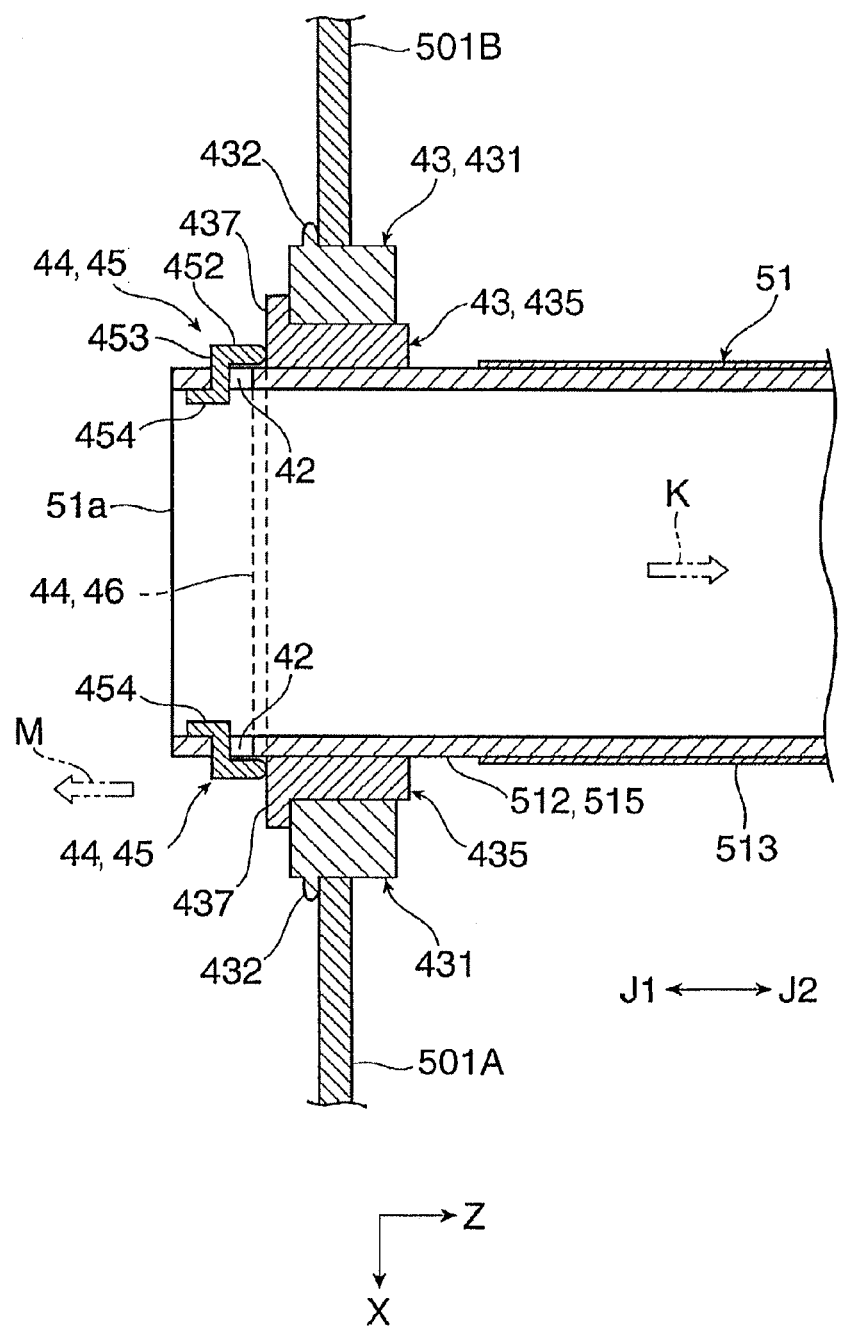
FIG. 8 is a schematic cross-sectional view of the roller support device illustrated in FIG. 5 taken along the horizontal line.

Specifically, the heating roller 51 is fitted into the attachment holes 510 with the bearing members 431 and the heat insulating members 435 of the support members 43 interposed therebetween in such a manner that the ridge 432 of the bearing member 431 of each support member 43 on the corresponding cylindrical portion 515 is in contact with the periphery of the attachment hole 510 of the corresponding one of the upper side support members 501B and 502B (FIG. 8). After the heating roller 51 is finished being fitted into the attachment holes 510, the upper side support members 501B and 502B are closed and fixed to the respective lower side support members 501A and 502A using screws 509 (FIG. 2).

Figure 6:
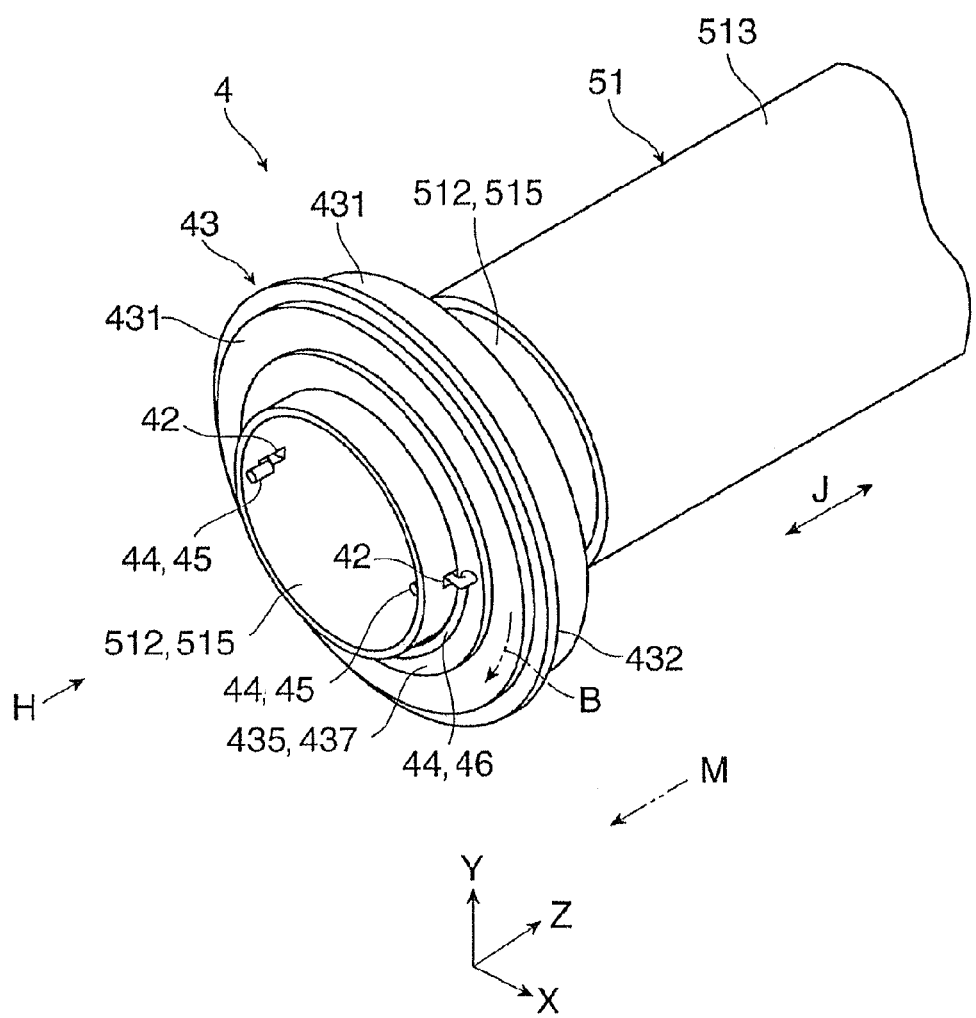
FIG. 6 is a perspective view of a characteristic portion of the roller support device illustrated in FIG. 5.

As illustrated in FIGS. 4, 6, and 8 and other drawings, the final bent portion 454 of the bent hook 45 of each restricting member 44 is thus inserted into the cylindrical portion 515 through the through hole 42 and opposes part of the portion 516 of the inner peripheral surface of the cylindrical portion 515 surrounding the through hole 42. In addition, the contact portion 46 of the restricting member 44 is in contact with (or is capable of contacting) the flange 437 of the heat insulating member 435 of the corresponding support member 43.

With the above-described processes, the roller support device 4, which supports the heating roller 51 of the fixing device 5 so that the heating roller 51 is rotatable, is assembled with the fixing device 5 as illustrated in FIGS. 2, 4, and 8 and other drawings.

As illustrated in FIG. 4 and other drawings, in the fixing device 5 including the roller support device 4, the heating roller 51 is rotatably supported by the support members 43 at the cylindrical portions 515 at the end portions 51a and 51b.

Specifically, the heat insulating members 435 of the support members 43 are fitted to the outer peripheral surface of the heating roller 51 at the cylindrical portions 515 so as to be generally integrated together. Thus, the heating roller 51 is rotatably supported by the bearing members 431 of the support members 43 with the heat insulating members 435 interposed therebetween.

On the other hand, the pressing rotatable member 53 having a belt-pad configuration is rotatably supported by the pair of swingable support members 503 and pressed against the heating roller 51 substantially in the rotational axis direction J of the heating roller 51 upon receipt of the spring forces of the pressure springs 506. Since the pressing rotatable member 53 is pressed against the heating roller 51, the fixing device 5 forms a pressure contact portion FN between the heating roller 51 and the pressing rotatable member 53 (FIG. 3).

When the fixing device 5 is in operation, such as in an image formation operation, the heating roller 51 rotates in the direction indicated with arrow A as a result of receiving rotary power from the gear 517.

At this time, the heating roller 51 rotates while the cylindrical portions 515 at the end portions 51a and 51b are supported by the support members 43. Specifically, the heating roller 51 rotates in the direction A, which is the same as the direction in which the heat insulating members 435 of the support members 43 rotate, while being integrated with the heat insulating members 435 and while the heat insulating members 435 are rotatably supported by the bearing members 431 of the support members 43. At this time, the restricting members 44 also rotate in the same direction A while being integrated with the heating roller 51.

In this fixing device 5, the heat insulating member 435 of each support member 43 is hindered from moving (being displaced) in the first direction J1 of the rotational axis direction of the heating roller 51 as a result of a portion (flange 437) of the heat insulating member 435 contacting the contact portion 46 of the corresponding restricting member 44 fixedly attached to the corresponding cylindrical portion 515 of the heating roller 51. Thus, the position of the support member 43 in the rotational axis direction J attached to the heating roller 51 is restricted.

In other words, as illustrated in FIG. 8, the two bent hooks 45 of each restricting member 44 are inserted into the corresponding through holes 42 at each cylindrical portion 515 and pressed against the first short sides 42a of the respective through holes. Thus, each restricting member 44 is hindered from moving in the first direction J1 of the rotational axis direction and fixed in place. The heat insulating member 435 of each support member 43 that contacts the contact portion 46 of the corresponding restricting member 44 is thus hindered from moving in the first direction J1 of the rotational axis direction.

Thus, in the fixing device 5, the restricting members 44 restrain the support members 43 from moving in the first direction J1 of the rotational axis direction even in the case, for example, where a component of force exerting in the thrust direction occurs when a helical gear is used as an example of the gear 517 that transmits rotary power to the heating roller 51, or a force exerting in the thrust direction occurs temporarily due to the effect of the pressure balance at the pressure contact portion FN.

Figure 7:
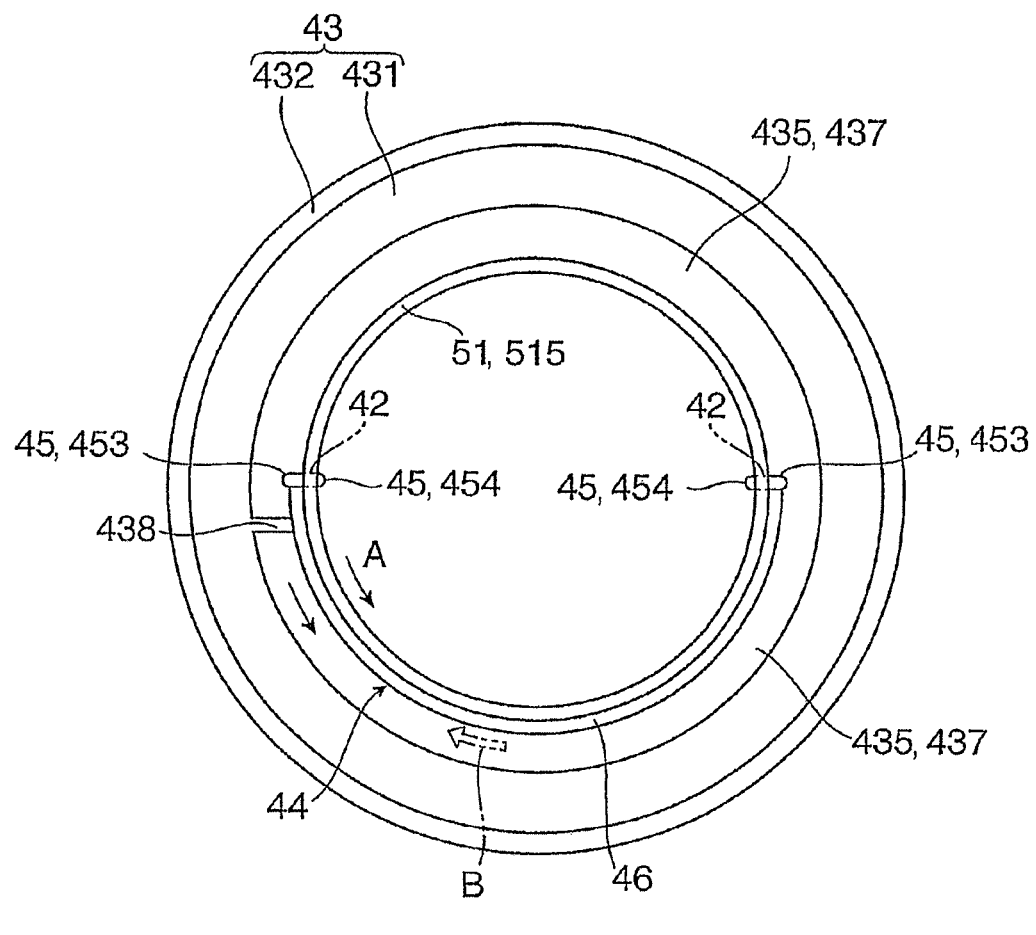
FIG. 7 is a view of the roller support device when viewed from the direction of arrow H in FIG. 6.

In this fixing device 5, as illustrated in FIG. 7 and other drawings, when the heat insulating member 435 stops temporarily without rotating integrally with the heating roller 51 or rotates at a lower speed, the contact portion 46 of each restricting member 44 rotating integrally with the heating roller 51 rubs against the heat insulating member 435 of the corresponding support member 43 of the roller support device 4 (abrasion resulting from contact movement in directions different from each other). Here, an external force (F1) in the direction opposite to the rotation direction A of the heating roller 51, as indicated with arrow B in FIG. 6 or 7, is exerted on the contact portion 46 of the restricting member 44. This external force (F1) is exerted on the restricting member 44 so as to detach the restricting member 44 from the cylindrical portion 515 of the heating roller 51.

In the restricting member 44 of the roller support device 4, however, the bent hooks 45 are not detached from the through holes 42 at the cylindrical portion 515 since the bent hooks 45, in particular, are not only inserted into the through holes 42 of the cylindrical portion 515, but also partially (at the final bent portions 454) hooked on the portions of the inner peripheral surface of the cylindrical portion 515 surrounding the through holes 42 so as to oppose the portions surrounding the through holes 42.

Thus, each restricting member 44 is prevented from coming off from the corresponding cylindrical portion 515 of the heating roller 51 even when the external force (F1) is exerted on the restricting member 44 due to the restricting member 44 being rubbed against the heat insulating member 435.

Figure 13:
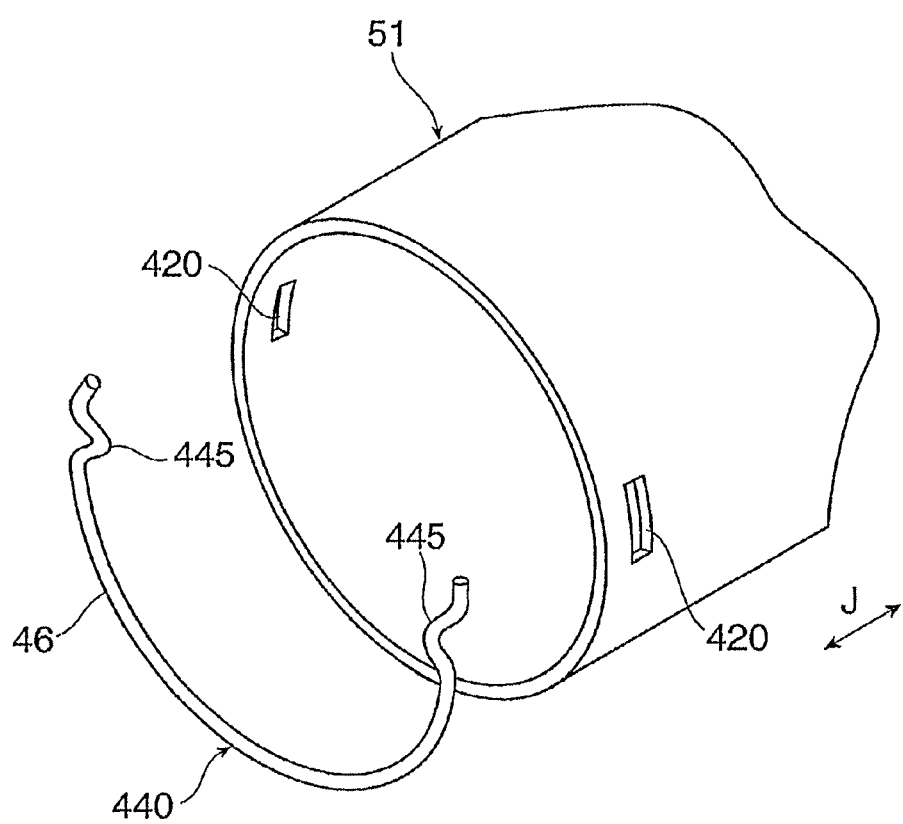
FIG. 13 is a perspective view of a configuration including through holes of a heating roller and a restricting member in an existing roller support device.
Figure 14A:
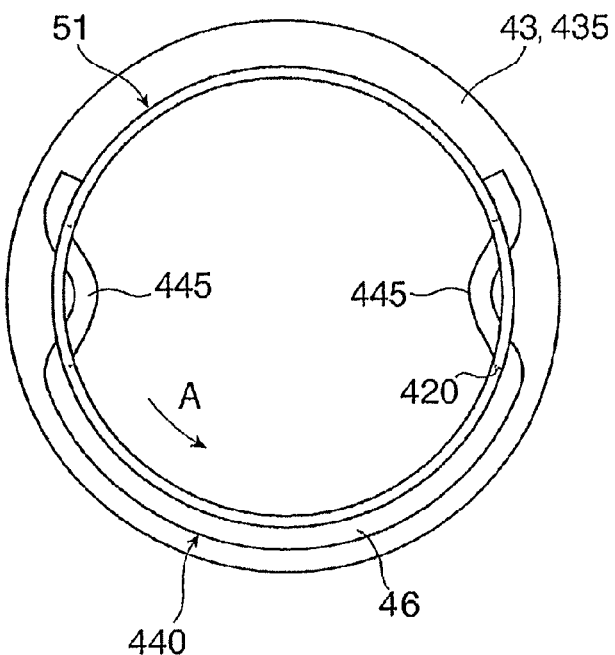
FIGS. 14A and 14B illustrates the existing roller support device illustrated in FIG. 13, where

In contrast, as illustrated in FIG. 13 or 14A, in the case where a restricting member 440 including protrusions 445, which are simply bent so as to protrude inward to be fitted into through holes 420 of the heating roller 51, is provided instead of the restricting member 44 in the roller support device 4, the restricting member 440 may come off from the heating roller 51, as described below. The through holes 420 for the restricting member 440 are long holes whose openings extend in the circumferential direction, perpendicular to the rotational axis direction J of the heating roller 51.

Figure 14B:
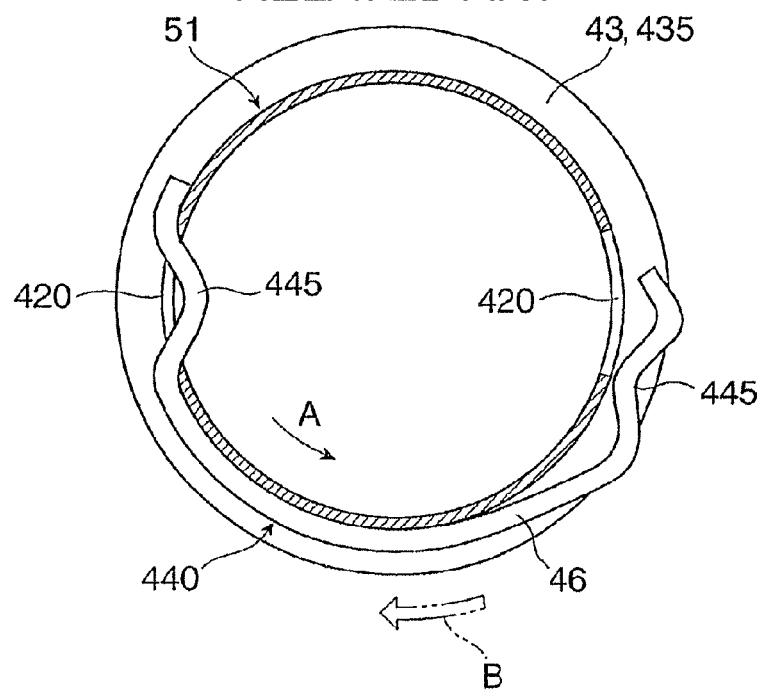

Specifically, when the restricting member 440 rubs against the corresponding support member 43 (heat insulating member 435) in the above-described state, an external force (F1) in the direction B, opposite to the rotation direction A of the heating roller 51, is exerted on the restricting member 440. Thus, the restricting member 440 having an arc shape opens outward, so that, as illustrated in FIG. 14B, one protrusion 445 is pulled out from the corresponding through hole 420 and displaced onto the outer peripheral surface of the heating roller 51. Consequently, the restricting member 440 comes off from the heating roller 51.

Other Exemplary Embodiment

Figure 11:
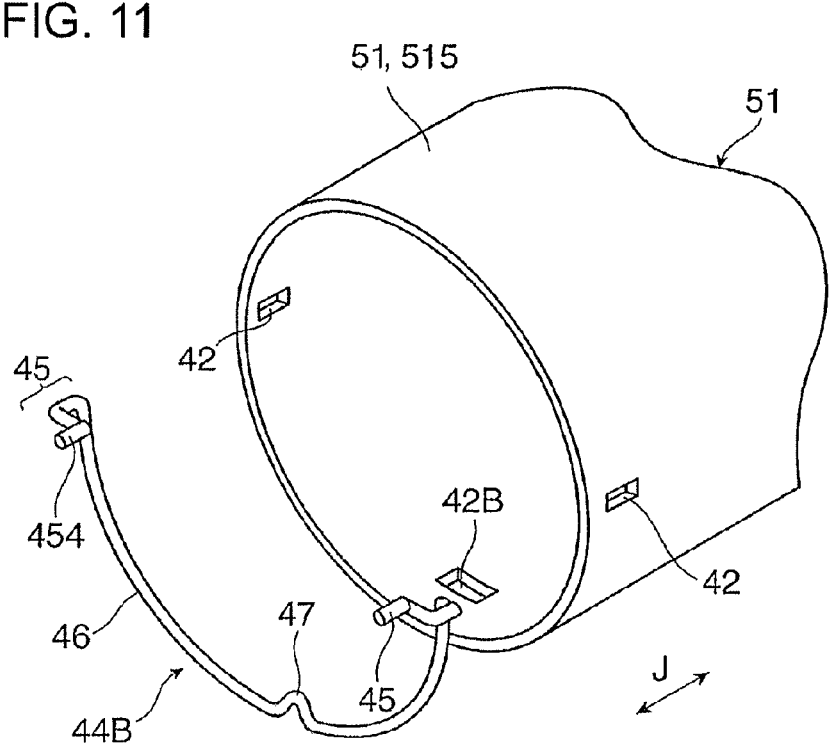
FIG. 11 is a perspective view of another configuration including through holes of a heating roller and a restricting member in the roller support device.

FIG. 11 illustrates a restricting member 44B having a configuration different from that of the restricting member 44 of the roller support device 4.

The restricting member 44B is different from the restricting member 44 according to the first exemplary embodiment in that it additionally includes an insert portion 47, which is bent so as to protrude inward, at substantially the middle of the arc-shaped contact portion 46. In addition, the cylindrical portion 515 of the heating roller 51 to which the restricting member 44B is fitted has, besides the through holes 42 according to the first exemplary embodiment, a third through hole 42B into which the insert portion 47 is inserted. In contrast to the case of the through holes 42, the through hole 42B is a long holes whose openings extend in the circumferential direction perpendicular to the rotational axis direction J of the heating roller 51. The through hole 42B is sized so as to be slightly large in the rotational axis direction J of the heating roller 51 for allowing the corresponding support member 43 to move toward the corresponding end at the attachment of the restricting member 44B.

In the case of the roller support device 4 including this restricting member 44B, the restricting member 44B is attached in the following manner. The two bent hooks 45 at both ends are inserted into the through holes 42 in the above-described manner and the insert portion 47 at the middle is inserted into the through hole 42B from the outer peripheral surface of the cylindrical portion 515. Thus, the contact portion 46 of the restricting member 44B is in contact with or located adjacent to the cylindrical portion 515 of the heating roller 51.

Consequently, each restricting member 44B is attached to the corresponding cylindrical portion 515 of the heating roller 51 while being supported by the cylindrical portion 515 at three points, including the supports at the two bent hooks 45 (two points) and the support at the insert portion 47. Thus, when the restricting member 44B is used, the restricting member 44B more stably restrains the support member 43 from moving in the first direction J1 of the rotational axis direction. In addition, the restricting member 44B is more firmly prevented from being displaced in the circumferential direction of the heating roller 51 with the additional support at the insert portion 47. Thus, the restricting member 44B is further less likely to become detached from the heating roller 51 even when being rubbed against the heat insulating member 435 of the support member 43.

Figure 12:
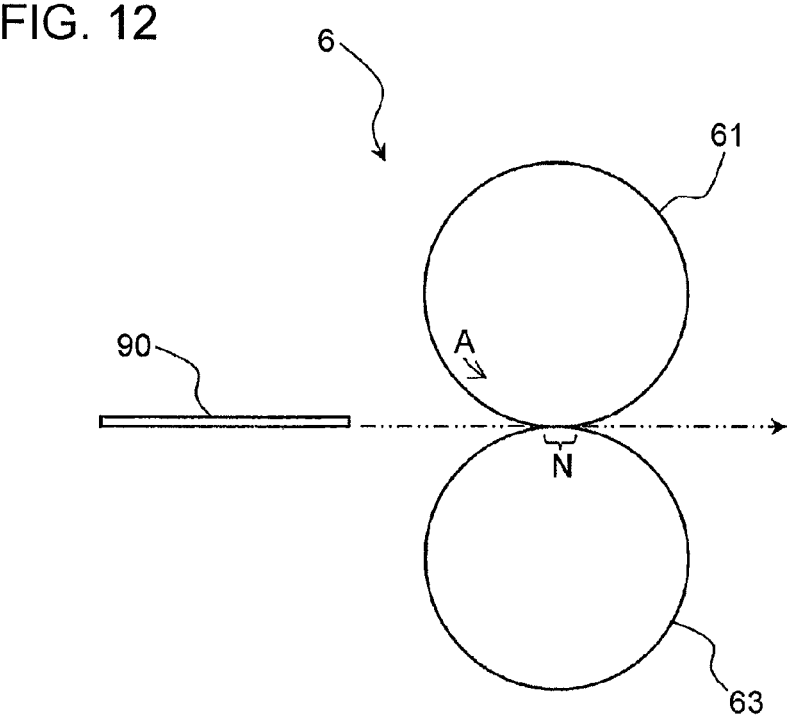
FIG. 12 is a schematic diagram of an example of a transport device including a roller support device.

In the first exemplary embodiment, the case where the roller support device 4 is assembled with the fixing device 5 is described as an example. Alternatively, as illustrated in FIG. 12, the roller support device 4 may be used, for example, as a device for supporting a rotary transport roller 61 in a transport device 6 so that the rotary transport roller 61 is rotatable. The rotary transport roller 61 at least includes a cylindrical portion having a through hole. The transport device 6 also includes a rotatable member 63 in the form of a roller, a belt, or the like. The rotatable member 63 rotates while forming a contact portion N along which the rotatable member 63 contacts the rotary transport roller 61 and transports an object 90 such as a recording sheet 9 while nipping the object 90.

Such a transport device 6 is usable in the image forming apparatus 1 or in other devices. The transport device 6 used in the image forming apparatus 1 may be, for example, a roller-form transport device that straightens a curl of the recording sheet 9. Alternatively, the rotary transport roller 61 may be a belt-form support roller.

Rollers in the roller support device 4 such as the heating roller 51 and the rotary transport roller 61 may have, at the portions other than the cylindrical portions 515 in which the through holes 42 are formed, thick roller portions or solid roller portions having no hollow. Each cylindrical portion 515 may be disposed at, instead of the end portion of the roller, a portion slightly closer to the middle away from the end portion of the roller.

Each support member 43 included in the roller support device 4 may be simply composed of a bearing member. Each restricting member 44 included in the roller support device 4 may include a contact portion having any shape other than a linear shape as long as the contact portion 46 is capable of contacting the support member 43. The final bent portion 454 of each bent hook 45 of the restricting member 44 disposed on the inner peripheral surface of the cylindrical portion 515 may be bent in other directions as long as it opposes part of the portion 516 of the inner peripheral surface of the cylindrical portion 515 surrounding the corresponding through hole 42.

The fixing device to which the roller support device 4 is attached is not limited to the fixing device 5 according to the first exemplary embodiment. For example, another type of a heating unit (such as an induction heating unit) may be used as the heating unit 52 of the heating roller 51 or a roller-form member may be used as the pressing rotatable member 53 of the heating roller 51.

An image forming apparatus according to an embodiment of the invention is not limited to an image forming apparatus that forms single-color images (monochrome images) exemplified in the first exemplary embodiment and may instead be, for example, an image forming apparatus that includes multiple image forming units 2 for forming toner images of multiple different colors to form multicolor images (color images). The image forming apparatus that forms color images may include, as needed, an intermediate transfer device to which toner images of different colors formed by the multiple image forming units 2 are temporarily first-transferred and from which the toner images are finally second-transferred to a recording sheet 9. The image forming apparatus including the transport device 6 is not limited to an apparatus that forms images with a developer and may be an image forming apparatus including an image forming unit 2 that forms images in other ways.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A roller support device comprising:
   a roller including a cylindrical portion having a through hole;
   a support member attached to a portion of an outer peripheral surface of the roller adjacent to the through hole to support the roller so that the roller is rotatable; and
   a restricting member including a bent hook and a first contact portion, the restricting member restraining the support member from moving in a first direction of a rotation axis of the roller by contacting the support member at the first contact portion to restrict a position of the support member, the bent hook having first and second portions, the first portion being positioned extending through the through hole to an inside of the cylindrical portion so as to oppose the through hole, the second portion being positioned inside the cylindrical portion and being bent relative to the first portion so as to oppose a portion of an inner peripheral surface of the cylindrical portion surrounding the through hole, and the first contact portion being disposed so as to extend in a circumferential direction of the outer peripheral surface of the roller and being capable of contacting the support member, wherein
   the second portion is directed toward one end of the roller in an axial direction of the roller, and the second portion is disposed inside the cylindrical portion.

2. The roller support device according to claim 1, wherein at least two of the through holes are arranged in the circumferential direction of the cylindrical portion, and wherein
   the restricting member includes at least two of the bent hooks so as to correspond to the at least two through holes.

3. The roller support device according to claim 2, wherein the through holes are long holes each having openings that extend in the axial direction of the roller, and wherein
   the one end of the roller is closer to the through holes.

4. The roller support device according to claim 3, wherein the restricting member is composed of an arc-shaped member having two end portions, the two end portions serving as the bent hooks.

5. The roller support device according to claim 2, wherein the restricting member is composed of an arc-shaped member having two end portions, the two end portions serving as the bent hooks.

6. The roller support device according to claim 1, wherein the through hole is a long hole having openings that extend in the axial direction of the roller, and wherein
   the one end of the roller is closer to the through hole.

7. The roller support device according to claim 6, wherein the restricting member is composed of an arc-shaped member having two end portions, at least one of the two end portions serving as the bent hook.

8. The roller support device according to claim 1, wherein the restricting member is composed of an arc-shaped member having two end portions, at least one of the two end portions serving as the bent hook.

9. A transport device, comprising:
   the roller support device according to claim 1; and
   a rotatable member that rotates while forming a second contact portion at which the rotatable member contacts the roller and transports an object while nipping the object.

10. An image forming apparatus, comprising:
    the transport device according to claim 9; and
    an image forming unit that forms an unfixed image and transfers the unfixed image to the object, wherein the object is a recording medium.

11. A fixing device, comprising:
    the roller support device according to claim 1, wherein the roller is a heating roller that rotates and is heated by a heating unit; and
    a pressing rotatable member that rotates while forming a pressure contact portion at which the pressing rotatable member contacts the heating roller with pressure, nips a recording medium to which an unfixed image is transferred, and allows the recording medium to pass through the pressure contact portion.

12. The fixing device according to claim 11, wherein the support member of the roller support device includes a bearing member, which supports the heating roller so that the heating roller is rotatable, and a heat insulating member, interposed at least between the bearing member and an outer peripheral surface of the heating roller, and wherein
    the first contact portion of the restricting member contacts the heat insulating member.

13. An image forming apparatus, comprising:
    the fixing device according to claim 11; and an image forming unit that forms the unfixed image and transfers the unfixed image to the recording medium, wherein the fixing device fixes the unfixed image transferred to the recording medium by the image forming unit.

14. The roller support device according to claim 1, wherein a distal-most tip end of the second portion is disposed inside the cylindrical portion.

15. The roller support device according to claim 1, wherein the bent hook extends from the first contact portion in three bends which respectively form the first portion, the second portion, and a third portion of the bent hook.

16. A roller support device comprising:

a roller including a cylindrical portion having a through hole;

a support member attached to a portion of an outer peripheral surface of the roller adjacent to the through hole to support the roller so that the roller is rotatable; and a restricting member including a bent hook and a contact portion, the restricting member restraining the support member from moving in a first direction of a rotation axis of the roller by contacting the support member at the contact portion to restrict a position of the support member, the bent hook having first and second portions, the first portion being positioned extending through the through hole to an inside of the cylindrical portion so as to oppose the through hole, the second portion including means for preventing the restricting member from coming off the cylindrical portion, and the contact portion being disposed so as to extend in a circumferential direction of the outer peripheral surface of the roller and being capable of contacting the support member.

* * * * *